United States Patent [19]
Foster

[11] 4,077,259
[45] Mar. 7, 1978

[54] EGG TEMPERATURE INDICATING DEVICE

[76] Inventor: Sidney Foster, R.R. #2, Box 20, Slayton, Minn. 56172

[21] Appl. No.: 738,076

[22] Filed: Nov. 2, 1976

[51] Int. Cl.² .................. G01K 1/02; G01K 1/14
[52] U.S. Cl. .................. 73/343 R; 73/352; 99/343
[58] Field of Search ........... 73/343 R, 352, 432 SD, 73/374; 99/342, 343, 440; 58/1, 144

[56] References Cited

U.S. PATENT DOCUMENTS

| 50,669 | 10/1865 | Malapert | 99/343 X |
|---|---|---|---|
| 719,781 | 2/1903 | Fritsch | 58/144 X |
| 3,270,661 | 9/1966 | Juvan | 99/343 |
| 3,606,792 | 2/1969 | Yoshimoto | 73/352 |
| 3,690,175 | 9/1972 | Butts | 73/352 |
| 3,757,674 | 9/1923 | Carroll | 99/440 |
| 3,967,502 | 7/1976 | Moran | 73/352 |
| 3,998,099 | 12/1976 | Chadwick | 73/374 |

*Primary Examiner*—Daniel M. Yasich
*Attorney, Agent, or Firm*—Charles J. Speciale

[57] ABSTRACT

An egg temperature indicating device adapted to stand in a boiling pan of water along with the cooking eggs comprising a body of the same general shape and density of an egg into which the bulb of a thermometer is centrally embedded, the thermometer shaft extending therefrom vertically.

8 Claims, 4 Drawing Figures

EGG TEMPERATURE INDICATING DEVICE

BACKGROUND OF THE INVENTION

1. Field of the Invention

This invention relates generally to culinary accessories and more particularly to a device for measuring the internal temperature of a boiled egg.

2. Description of the Prior Art

As anyone that has boiled eggs can tell you it is very difficult to make the egg to the consistency and degree of cooking preferred by the consumer. The boiled eggs are either too soft or too hard. Certainly this is the case in restaurants where they rarely cook a boiled egg as you like it. Various timing devices have been tried including clock timers and sand "hour" glass timers. Some of these are described in U.S. Pat. Nos. 1,125,213; 1,184,812; 1,272,318; and 1,810,258, merely to name a few. In these patents the timers are even combined with egg holding structures but the results are generally hit or miss because of the variables of the initial egg temperature, the water temperature and failure to start the timer at the point of boiling. One patent, U.S. Pat. No. 3,270,661 does disclose a device for measuring egg temperatures, but it involves an extremely complex and costly device which also requires the destruction of the test egg. A simple, accurate egg temperature indicator would therefore be most advantageous.

SUMMARY OF THE INVENTION

It is therefore, among one of the principal objectives of this invention to provide a device for measuring the internal temperature of a boiled egg which is at the same time effective as well as simple of construction and thus economical.

In accordance with the invention there is now provided an egg temperature indicating device adapted to stand in a boiling pan of water containing the cooking eggs which comprises a body having the same general shape and essentially the same density as the average egg, said body having the bulb of a thermometer generally centrally embedded therein, the shaft of the thermometer extending vertically from said body so that the temperature gradations marked on said shaft may be read. When the temperature reaches the desired point the eggs are immediately removed from the boiling water. By simple trial and error method the desired cooking temperatures may be established for the preferred degrees of doneness.

BRIEF DESCRIPTION OF THE DRAWING

The invention will be hereinafter more fully described with reference to the accompanying drawings in which.

DESCRIPTION OF THE PREFERRED EMBODIMENT

Figure 2:
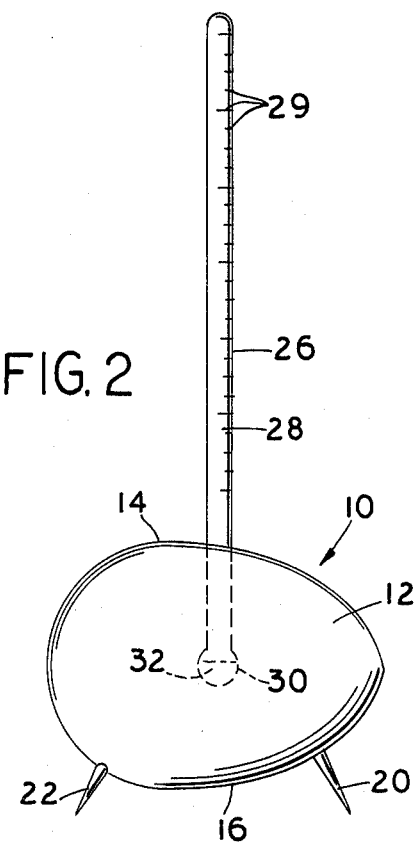
FIG. 2 is an end elevational view thereof.
Figure 1:
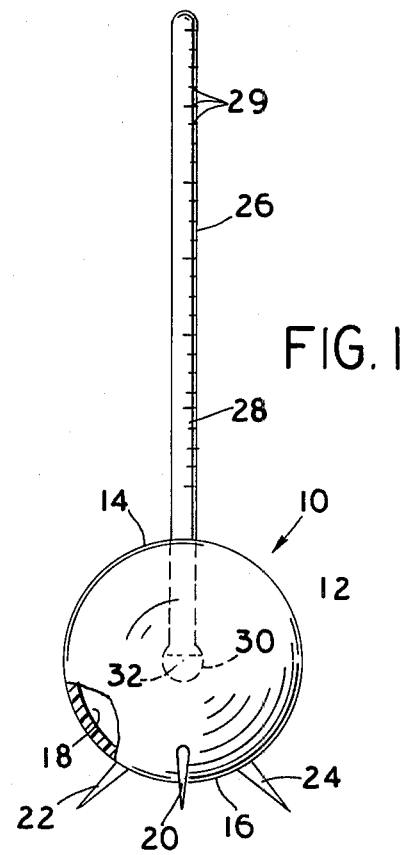
FIG. 1 is a side elevational view of the invention device.
Figure 3:
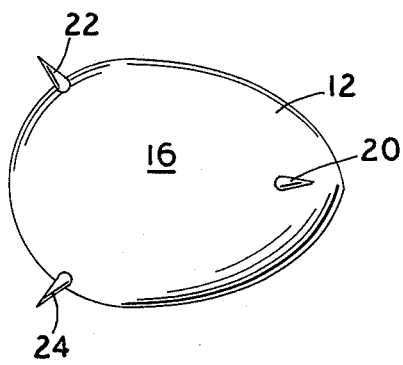
FIGS. 3 and 4 are bottom and top plan views, respectively.
Figure 4:
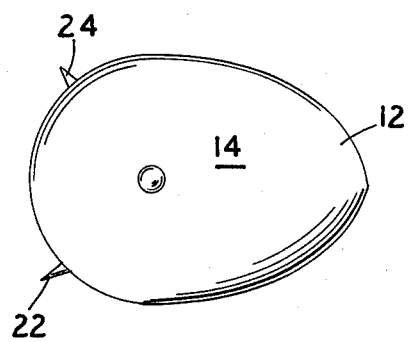

Referring now to the figures of the drawing, there is shown therein the invention egg temperature indicating device 10 (hereinafter referred to as "device"). The device comprises a body 12 shaped to conform generally to the shape of an egg which body 12 has a top portion 14 and bottom portion 16. Body 12 can be made of a suitable hard plastic substance and its cavity 18 can be filled with a suitable solid substance such as a plastic foam, or it can be filled with a liquid substance such as an oil. The choice is not critical but what is critical is that the material chosen be of substantially the same density as the yolk and white of the average egg.

Extending from the underside or bottom portion 16 of the body are three angularly outwardly projecting legs 20, 22 and 24. The legs are spaced in triangular fashion with the leg 20 being the apex of the triangle and legs 22 and 24 forming the base of the triangle. Said legs can be permanently secured to the body 12, such as by bonding, or they can be removably secured thereto by screwing them into the body via conventional screwing means. The importance of the latter feature will be subsequently shown hereinbelow.

A thermometer 26, having a vertical shaft 28 with numbered temperature gradations 29 provided thereon, and a bulb 30 filled with suitable liquid 32, conventionally known to the art as being used in thermometers, is embedded into the body 12 so that the bulb 30 is in a generally central location inside the body of the device. The shaft 28 thus extends vertically from the top portion 14 of the body. The shaft should be of a length such that about half of it extends above the rim of an average sided boiling pan when the device stands therein, as will be hereinafter described.

In use, the device is kept in the general proximity of the egg storage area so that the initial temperature of the eggs and device is the same. Generally eggs are stored in refrigerators or other cool places. Some refrigerators have egg-shaped holders for storage and if this is the case, all that need be done is to screw off the legs of the device. It will be recalled that the legs can be so adapted. Next, when it is desired to boil some eggs what is done is to stand the device erect in the bottom of the pan of water into which the eggs are also placed, (screwing the legs back on, if necessary). The eggs are then cooked by boiling or simmering and the thermometer readings are observed. The temperature of the eggs and of the device will rise at the same rate since they are of the same density and in the same environment. When the thermometer reading reaches the predetermined value for the degree of doneness the eggs are immediately removed from the boiling water. Generally, the body of the device and eggs are about the same size, but, if the eggs are somewhat larger, allowance can be made for the size differential by a few extra seconds of cooking. This is not a scientific experiment so some allowances can be made in cooking. The shaft of the thermometer should have about one half of its length projecting above the rim of the boiling pan, for easy temperture reading.

It can be seen that the present device is of simple construction and inexpensive materials yet serves a very useful culinary purpose; eggs cooked just the way you like them.

What is claimed is:

1. An egg temperature indicating device adapted to be supported to stand in a cooking pan of water containing at least one cooking egg and which comprises a body having the same general shape and the interior portion constructed to be substantially the same density as the average uncooked egg, and a thermometer having a bulb containing temperature indicating liquid, and a shaft marked with temperature gradations along its entire length extending vertically from and integrally forward with said bulb, said bulb being generally centrally located in said body, said shaft of said thermometer in turn vertically projecting from said body so that said temperature gradations may be observable and the cooked egg immediately removed at a predetermined temperature.

2. A device according to claim 1, wherein said body has a hollow cavity said cavity being filled with a material having substantially the same density as the average uncooked egg.

3. A device according to claim 2, wherein said cavity is filled with a solid material.

4. A device according to claim 2, wherein said cavity is filled with a liquid.

5. An egg temperature indicating device adapted to stand in a cooking pan of water containing at least one cooking egg and which comprises a body having the same general shape and of a material selected to have substantially the same density as the average uncooked egg, and a thermometer having a bulb containing temperature indicating liquid, and a shaft marked with temperature gradations along its entire length extending vertically from and integral with said bulb, said bulb being generally centrally located in a cavity in said body, said shaft of said thermometer in turn vertically projecting from said body so that said temperature gradations may be observable and the cooked egg immediately removed at a predetermined temperature, wherein said cavity is filled with a solid material and wherein said body of said device has an upper portion and an underside portion, a plurality of legs being provided extending from said undesired portion so that said device is adapted to stand.

6. A device according to claim 5, wherein said shaft of said thermometer projects from the upper portion of said body a distance of about one-half its length above the rim of the cooking pan.

7. A device according to claim 5, wherein said legs are three in number and are bonded to said underside portion in spaced triangular disposition.

8. A device according to claim 5, wherein said legs are three in number and are removably secured to said underside portion in spaced triangular disposition.

* * * * *